(12) United States Patent
Lin et al.

(10) Patent No.: US 8,839,423 B2
(45) Date of Patent: Sep. 16, 2014

(54) METHOD AND SYSTEM FOR SHARING MOBILE SECURITY INFORMATION

(75) Inventors: Yu Lin, Beijing (CN); Shihong Zou, Beijing (CN)

(73) Assignee: Netqin Mobile, Inc., Beijing (CN)

( * ) Notice: Subject to any disclaimer, the term of this patent is extended or adjusted under 35 U.S.C. 154(b) by 189 days.

(21) Appl. No.: 13/236,895

(22) Filed: Sep. 20, 2011

(65) Prior Publication Data
US 2013/0074159 A1    Mar. 21, 2013

(51) Int. Cl.
| | | |
|---|---|---|
| G06F 11/00 | (2006.01) |
| G06F 12/14 | (2006.01) |
| G06F 12/16 | (2006.01) |
| G08B 23/00 | (2006.01) |
| G06F 21/56 | (2013.01) |
| G06F 17/30 | (2006.01) |

(52) U.S. Cl.
CPC .......... *G06F 21/56* (2013.01); *G06F 17/30867* (2013.01); *G06F 17/30893* (2013.01); *G06F 17/30896* (2013.01); *G06F 17/30861* (2013.01); *G06F 17/30864* (2013.01); *G06F 17/3089* (2013.01); *G06F 12/14* (2013.01)
USPC .................... 726/22; 726/23; 726/24; 726/25

(58) Field of Classification Search
CPC .............. G06F 12/14; G06F 17/30861; G06F 17/30864; G06F 17/30867; G06F 17/3089; G06F 17/30893; G06F 17/30896; G06F 21/56
USPC .................................................. 726/4, 22–25
See application file for complete search history.

(56) References Cited

U.S. PATENT DOCUMENTS

| | | | |
|---|---|---|---|
| 8,200,247 B1 * | 6/2012 | Starenky et al. ........... 455/456.3 |
| 8,756,692 B2 * | 6/2014 | Williams ........................ 726/24 |
| 2007/0203996 A1 * | 8/2007 | Davitz et al. .................. 709/206 |
| 2007/0255785 A1 * | 11/2007 | Hayashi et al. ............... 709/204 |
| 2009/0164475 A1 * | 6/2009 | Pottenger ........................ 707/10 |
| 2010/0185519 A1 | 7/2010 | Ramaswamy |
| 2010/0235389 A1 * | 9/2010 | Bhamidipati et al. ........ 707/770 |
| 2011/0093560 A1 * | 4/2011 | Morris .......................... 709/217 |
| 2011/0201317 A1 | 8/2011 | Karandikar et al. |
| 2011/0276396 A1 * | 11/2011 | Rathod ..................... 705/14.49 |
| 2011/0320533 A1 * | 12/2011 | Belinsky et al. .............. 709/203 |
| 2012/0066212 A1 * | 3/2012 | Jennings ....................... 707/723 |
| 2012/0158720 A1 * | 6/2012 | Luan et al. .................... 707/732 |
| 2012/0215865 A1 * | 8/2012 | Sacks et al. ................... 709/206 |
| 2012/0216284 A1 * | 8/2012 | Dhamankar et al. ............ 726/24 |
| 2012/0246580 A1 * | 9/2012 | Bouverat ....................... 715/753 |
| 2012/0259753 A1 * | 10/2012 | Orad et al. ....................... 705/35 |

* cited by examiner

*Primary Examiner* — Jeffrey Pwu
*Assistant Examiner* — Jayesh Jhaveri
(74) *Attorney, Agent, or Firm* — Scully, Scott, Murphy & Presser, P.C.

(57) ABSTRACT

Methods and systems for sharing mobile security information are disclosed. According to an embodiment, a method for sharing mobile security information includes: providing to a user of the mobile device an option to share the mobile security information, extracting content from mobile security information upon receiving the user's selection, and posting the extracted content to a social network service.

12 Claims, 10 Drawing Sheets

METHOD AND SYSTEM FOR SHARING MOBILE SECURITY INFORMATION

FIELD OF THE INVENTION

The present disclosure relates to the field of mobile security and, more particularly, to methods and systems for sharing mobile security information.

BACKGROUND

With the increasing popularity of mobile devices (e.g., smart telephones and other such wireless devices), such target devices become vulnerable to virus attacks. For example, mobile phones are increasingly being provided with features such as ability to access electronic mail and world-wide web, multi-media messaging services (MMS), games, short message services (SMS), desktop applications, etc. Due to such connectivity applications, mobile phones (or mobile devices, in general) are increasingly more vulnerable to virus attacks. Furthermore the virus can spread from one mobile phone to another, thereby infecting additional mobile phones.

Existing virus scanning process includes scanning mobile devices through a connection with a PC, scanning through a local anti-virus software installed on a smart phone or a scanning engine installed on a server end communicating with a smart phone through network connection. The virus scanning results normally include file names or program identifications of virus.

Users of the existing anti-virus software may only see the results of virus scanning, instantaneously detected security threat on his/hers mobile phone, and the search results cannot tell a user how badly a detected virus have effected his/her mobile phone and personal information. A mobile virus may infect thousands of mobile phones, but an individual victim may only know his/her situation through searching the web or a broadcast from an anti-virus software producer.

With the development of social networks and micro blogging service, the way of communication has been greatly changed. Individuals are now capable of sharing what they observe in their surroundings, information about events, and what their opinions are about certain topics, for example government policies in healthcare. Moreover, these services store various metadata from these posts, such as the location and time of these shared posts. However, information concerning other mobile applications, such as, virus scanning results, must be input manually by the user of social networks or micro blogging service. Due to the limit of mobile device-human interface, input operation on mobile device is not as easy as PC keyboard and mouse, and transferring information between applications on mobile platform could be a time-consuming task.

One of the advantages of social networks and micro blogging service is their nature of being open. A user can share information to his/her surroundings with the people who have never been known to the user. However, such sharing may not broadcast the information to certain unknown users who have definite interest to the content of the information, unless the unknown users become the follower/surroundings of the sharing user. For example, a user may share his/her virus scanning results with his/her followers/surroundings, but the user may not post/send the scanning results to other virus victims if the victim is not on the follower list of the sharing user.

SUMMARY

One aspect of the disclosure is directed to a method for sharing mobile security information, the method comprising: causing a display of a mobile device to provide an option for sharing the mobile security information to a user of the mobile device, causing a CPU of the mobile device to read the mobile security information stored in a memory of the mobile device and extract content from the mobile security information upon receiving the user's selection, and sending a request to a social network service for posting the extracted content.

Another aspect of the disclosure is directed to a system for sharing mobile security information, the system comprises an interface for controlling a display of a mobile device to provide an option to share the mobile security information to a user of the mobile device, a content management module for controlling a CPU of the mobile device, reading mobile security information stored in a memory of the mobile device and extracting content from mobile security information upon receiving the user's selection, and a communication module for connecting with a social network service and uploading the extracted content to the social network service.

Other aspects and features can become apparent to those skilled in the art upon reference to the following non-limited detailed description taken in conjunction with the provided figures.

BRIEF DESCRIPTION OF THE DRAWINGS

The disclosure is illustrated by way of example and not intended to be limited by the figures of the accompanying drawings in which like references indicate similar elements and in which.

It is noted that the drawings are not necessarily to the scale.

DETAILED DESCRIPTION

Advantages and features disclosed in this document and methods of accomplishing the same may be understood more readily by reference to the following detailed description of example embodiments and the accompanying drawings. The present invention may, however, be embodied in many different forms and should not be construed as being limited to the embodiments set forth herein. Rather, these embodiments are provided so that this disclosure can be as thorough and complete as possible and can help to fully convey the concept of the invention to those skilled in the art, and the present invention is only defined by the appended claims. Like reference numerals refer to like elements throughout the specification.

1. System

Figure 1:
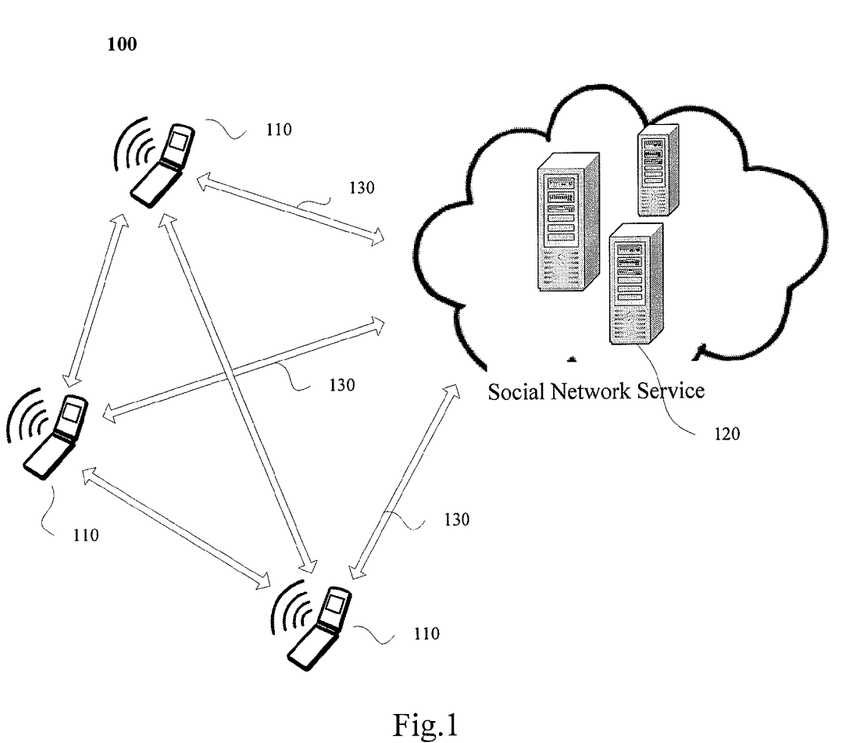
FIG. 1 shows a block diagram of an illustrative system according to an embodiment.

Referring to FIG. 1, a block diagram of an illustrative system 100 is shown. In an embodiment, system 100 can include one or more client ends 110 and a social network service 120. The client ends 110 can be installed on mobile devices, and the social network service 120 can be installed on a server. The social network service 120 can communicate with multiple client ends 110 and handling information sharing requests from client ends 110 on basis of cloud computing. The client ends 110 and the sever end 120 can communicate through external networks 130. External networks 130 can be, for example, mobile data service on the 2G and 3G cellular communication systems global system for mobile devices, such as but not limited to, GPRS, CDMA1X, WCDMA, etc.

Figure 2:
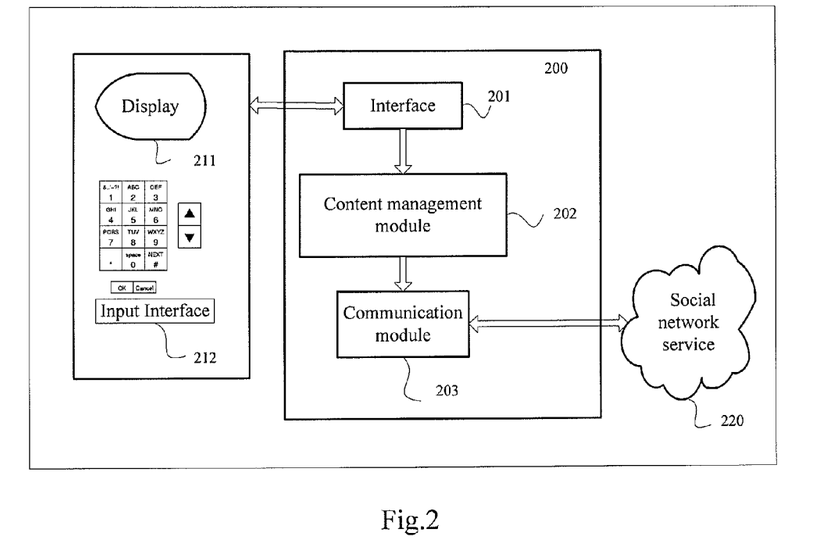
FIG. 2 shows an embodiment of the system for sharing mobile security information.

Referring to FIG. 2, a client end 200 can include an interface 201, a content management module 202, and a communication module 203. Interface 201 can communicate with mobile device input and output interface, such as, display 211 and keyboard 212, presenting an option for sharing mobile security information.

The mobile security information may include a plurality of virus ID detected using a complete virus scanning, a virus detected promptly when a mobile user downloads/receives a virus-infected file, a message including malicious code detected simultaneously when received or spam detected when received. Other mobile security threats, such as, a hyper link to a web site having malicious code, virus-infected email attachment may also apply to the systems and methods disclosed in this document.

The content management module 202 can communicate with operation system of the mobile device, extracting the content of mobile security information. For example, in a Symbian mobile operating system, extracting an identifier of a mobile application infected by a mobile virus and being detected during a scanning, i.e. "2011-w.sis". The identifier can be read from the memory storage of the mobile device, or from a specific folder stored in an external memory of the mobile device. Such a folder or file can keep record of all mobile security information and can be updated automatically after each detection activity performed by the mobile device, for example, in the path "E:\App\netqin_anti-virus\reports\threats.xml." The communication module 203 can communicate with the mobile device hardware, causing the mobile device to be connected with a social network service and uploading the extracted content to the social network service. According to an embodiment of the invention, the request may include time of posting, user identification on the social network service, content to be shared, source of the content, and user information, etc.

Figure 3:
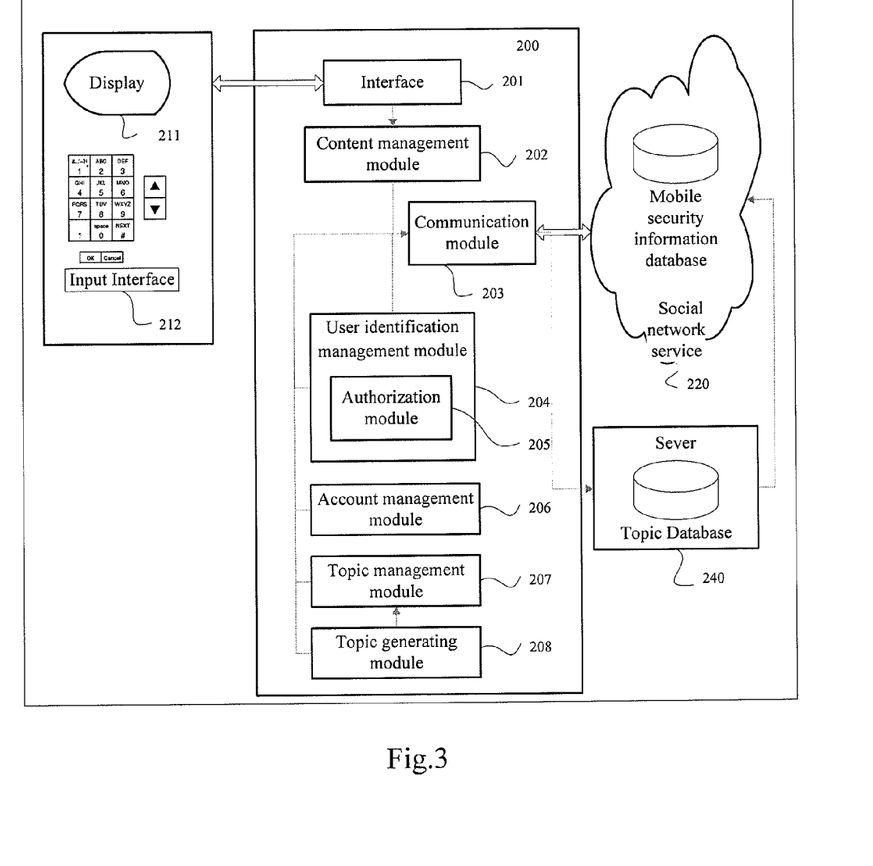
FIG. 3 shows an embodiment of the detailed system for sharing mobile security information.

As shown in FIG. 3, a client end 200 can further include a user identification management module 204, an account management module 206, a topic management module 207, and a topic generating module 208. The user identification management module 204 can associate a user identifier on the social network service with a user identifier on the mobile security application, if there is a user identifier on the social network service. The user identifier on the mobile security application can be required for existing mobile security application, which can be useful for activation and updating the mobile security application. The user identification management module 204 can further include an authorization module 205. When associating the user identifier on the social network service with the user identifier on the mobile security application, such associating or binding activity can require approval by the social network service provider. The authorization module 205 can be configured to perform the authorization process. According to an embodiment of the invention, the authorization module 205 can control the display 211 of a mobile device to provide an interface for the user to access an authorization endpoint of the social network service, causing the communication module 203 to receive an authorization from the social network service when the user logs on or registers the social network service, controlling the CPU of the mobile device to read a set of temporary credentials stored in the memory of the mobile device, causing the communication module 203 to send a request for a set of tokens using the set of temporary credentials, and causing the communication module 203 to receive the set of tokens from the social network service. The set of tokens can then be sent to the social network service 220 when sending a request to post the extracted content to the social network service 220.

The account management module 206 can provide an option to the user to create an account on the social network service which can identify the extracted content of the mobile security information.

The topic management module 207 can detect topics posted on the social network service that are relevant to the extracted content, posting a copy of the extracted content following the relevant topics on the social network service, and redirecting the user to an interface of the social network service presenting the relevant topic. For example, when the social network service is Sina.com.cn micro blog, the topic management module 207 can send a request in the format "% extracted content %" to search relevant topics. The topic management module 207 can then post the extracted content as a comment to the relevant topics and redirecting the user to an interface of the social network service presenting the relevant topics. In such a way, the user could see his comment to the relevant topics, as well as other comments to the topics posted by other users. If the search result shows that there is no relevant topic, the topic generating module 208 can generate a topic at the social network service. For example, in Sina.com.cn micro blog, the topic generating module 208 can send a request in the format "#extracted content#" to generate a new topic for the extracted content.

According to an embodiment of the invention, the system for sharing mobile security information can include a client end and a server end. As show in FIG. 3, a server end 240 can collect all topics and mobile security information from the social network service 220 periodically, and updating a topic database. The database can include all topics and corresponding information posted by users of client end 200. The sever end 240 may be provided by the mobile security application provider. Thus, the database can facilitate the application provider to acquire immediate information on user's attention to the mobile security information. With the information stored in the anti-virus server, the anti-virus software provider may get statistics on how many users have pay attention on the security information, how many users have been infected mobile virus, or which virus have been distributed broadly, etc. In addition, the collecting may include semantic analysis to ensure all relevant topics are found out and collected. When a user posts an extracted content, the mobile device can first send a request to the sever end 240 for searching relevant topics, and sending relevant topics and corresponding web linkage of the topics to the mobile device. The client end 200 can then post the content following one or more topics on the social network service, upon user's selection(s) and redirecting the user to the interface present topics on the social network service.

According to an embodiment of the invention, the social network service 220 can further include a mobile security information database. For example, the mobile security information database can comprise an account registered under the name or title of the mobile security application provider, e.g. "NetQin mobile Inc." All relevant topics can be posted by the provider's account or forwarded by that account, and all information shared following the topics can be either posted by the account or forwarded by the account. Thus, the mobile security information database can include all recent mobile security information and comments posted by users. Each individual user can access the mobile security information database by joining the followers of the provider's account.

2. Operation Methodology

Figure 4A:
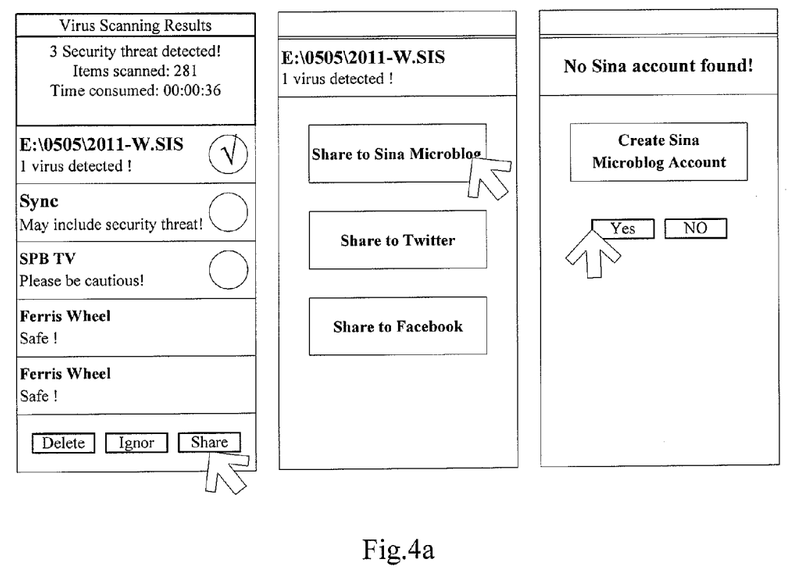
FIG. 4a shows an illustrative example of the operation for sharing mobile security information according to an embodiment.
Figure 4B:
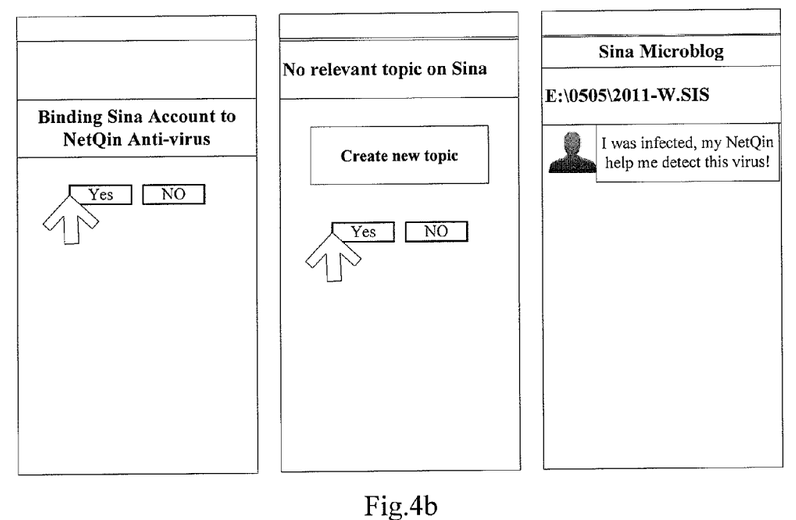
FIG. 4b shows an illustrative example of the operation for sharing mobile security information according to an embodiment.

FIGS. 4a and 4b show three screen display of an example of an interface for a user to share mobile security information. As shown in FIG. 4a, the process can begin with mobile security information. Here, three security threats are detected, wherein one virus is found, the infected file name is "2011-W.SIS", located in the path "E:\0505\2011-W.SIS." Within each box presenting the detected results, there can be a check box for a user to choose. At the bottom of the screen display, three touch items for the user, i.e. "Delete," "Ignore," and "Share," can be provided.

As shown in the middle screen display of FIG. 4a, after the user chooses the item, "Share," one or more social network service providers for the user, i.e. "Sina Microblog," "Twitter," and "Facebook," can be provided. When the user chooses one of the social network service providers, the software can then search a relevant user account stored in the mobile device. If no relevant user account can be found, as shown in the right screen display of FIG. 4a, an option for the user to create a user account on the social network service can be provided.

Following the operation shown in FIG. 4a, and in the left screen display in FIG. 4b, an option for the user to bind the user account on the social network service to the user account on the anti-virus software can be provided. After the accounts are bound, the client end software can then search on the social network service to find topics relevant to the detected security threat. If there is no relevant topic found, as shown in the middle screen display of FIG. 4b, an option to the user to create a new topic for the security threat (e.g., on Sina Microblog) can be provided. Upon the user's selection, the client end software can then send a request for creating the new topic, posting and redirecting the user to Sina Microblog. The next screen display can present a user interface on the Sina Microblog with the new topic and the first posting following the topic.

Figure 5:
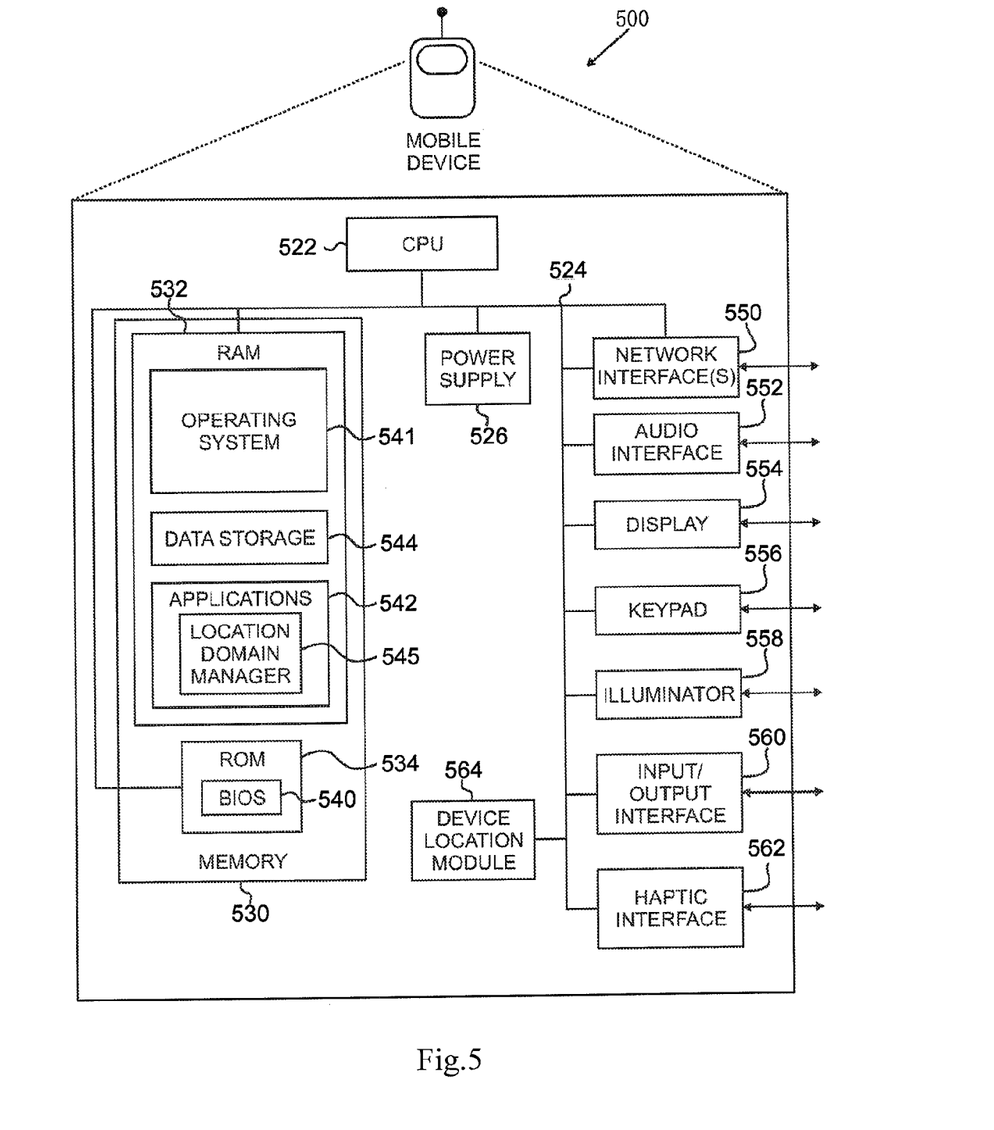
FIG. 5 shows an illustrative example of a mobile device for implementing the process according to an embodiment.

FIG. 5 shows one illustrative example of a mobile device 500 for implementing the process disclosed herein. Mobile device 500 can include many additional or fewer components than those shown in FIG. 5. Mobile device 500 can represent, for example, mobile devices 110 of FIG. 1. As shown, mobile device 500 can include a central processing unit (CPU) 522 in communication with a mass memory 530 via a bus 524. Mobile device 500 can also include a power supply 526, one or more network interfaces 550, an audio interface 552, a display 554, a keypad 556, an illuminator 558, an input/output interface 560, a haptic interface 562, and a device location module 564. Power supply 526 can provide power to mobile device 500. A rechargeable or non-rechargeable battery may be used to provide power. The power may also be provided by an external power source, such as an AC adapter or a powered docking cradle that supplements and/or recharges a battery.

Mobile device 500 can optionally communicate with a base station (not shown), or directly with another computing device. Network interface 550 can include circuitry for coupling mobile device 500 to one or more networks, and can be constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), short message service (SMS), general packet radio service (GPRS), wireless application protocol (WAP), ultra wide band (UWB), IEEE 802.16 Worldwide Interoperability for Microwave Access (WiMax), session initiation protocol/real-time transport protocol (SIP/RTP), or any of a variety of other wireless communication protocols. Network interface 550 can sometimes be known as a transceiver, transceiving device, or network interface card (NIC).

Audio interface 552 can be arranged to produce and receive audio signals such as the sound of a human voice. For example, audio interface 552 can be coupled to a speaker and microphone (not shown) to enable telecommunication with others and/or generate an audio acknowledgement for some action. Display 554 may be a liquid crystal display (LCD), gas plasma, light emitting diode (LED), or any other type of display used with a computing device. Display 554 may also include a touch sensitive screen arranged to receive input from an object such as a stylus or a digit from a human hand.

Keypad 556 can comprise any input device arranged to receive input from a user. For example, keypad 556 may include a push button numeric dial or a keyboard. Keypad 556 may also include command buttons that are associated with selecting and sending images. Illuminator 558 may provide a status indication and/or provide light. Illuminator 558 may remain active for specific periods of time or in response to events. For example, when illuminator 558 is active, it may backlight the buttons on keypad 556 and stay on while the client device is powered. Also, illuminator 558 may backlight these buttons in various patterns when particular actions are performed, such as dialing another client device. Illuminator 558 may also cause light sources positioned within a transparent or translucent case of the client device to illuminate in response to actions.

Mobile device 500 can also comprise input/output interface 560 for communicating with external devices, such as a headset, or other input or output devices not shown in FIG. 5. Input/output interface 560 can utilize one or more communication technologies, such as USB, infrared, Bluetooth™, or the like. Haptic interface 562 can be arranged to provide tactile feedback to a user of the client device. For example, the haptic interface may be employed to vibrate mobile device 500 in a particular way when another user of a computing device is calling.

Figure 6:
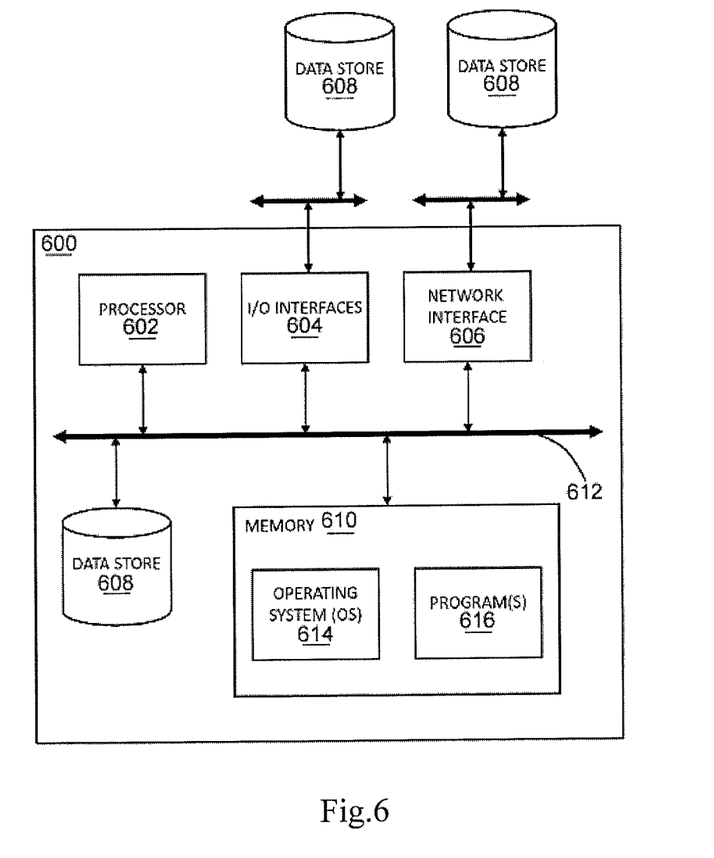
FIG. 6 shows an illustrative example of a server for implementing the process according to an embodiment.

Referring to FIG. 6, in an example embodiment, a block diagram illustrates a server 600 which can be used in the system 100 or standalone. The server 600 can be a digital computer that, in terms of hardware architecture, can generally include a processor 602, input/output (I/O) interfaces 604, a network interface 606, a data store 608, and memory 610. The server 600 can include additional components and suitably configured processing logic to support other operating features that may or may not be described in detail herein. The components (602, 604, 606, 608, and 610) can be communicatively coupled via a local interface 612. The local interface 612 may be, for example but not limited to, one or more buses or other wired or wireless connections. The local interface 612 may have additional elements, which are omitted for simplicity, such as controllers, buffers (caches), drivers, repeaters, and receivers, among many others, to enable communications. Further, the local interface 612 may include address, control, and/or data connections to enable appropriate communications among the aforementioned components.

The processor 602 can be a hardware device for executing software instructions. The processor 602 can be any custom made or commercially available processor, a central processing unit (CPU), an auxiliary processor among several processors associated with the server 600, a semiconductor-based microprocessor (in the form of a microchip or chip set), or generally any device for executing software instructions. When the server 600 is in operation, the processor 602 can be configured to execute software stored within the memory 610, to communicate data to and from the memory 610, and to generally control operations of the server 600 pursuant to the software instructions. The I/O interfaces 604 may be used to receive user input from and/or for providing system output to one or more devices or components. User input may be provided via, for example, a keyboard, touch pad, and/or a mouse. System output may be provided via a display device and a printer (not shown). I/O interfaces 604 can include, for example, a serial port, a parallel port, a small computer system interface (SCSI), an infrared (IR) interface, a radio frequency (RF) interface, and/or a universal serial bus (USB) interface.

The network interface 606 may be used to enable the server 600 to communicate on a network, such as the Internet, and the like. The network interface 606 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 606 may include address, control, and/or data connections to enable appropriate communications on the network. A data store 608 may be used to store data. The data store 608 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 608 may incorporate electronic, magnetic, optical, and/or other types of storage media. In one example, the data store 608 may be located internal to the server 600 such as, for example, an internal hard drive connected to the local interface 612 in the server 600. Additionally in another embodiment, the data store 608 may be located external to the server 600 such as, for example, an external hard drive connected to the I/O interfaces 604 (e.g., SCSI or USB connection). In a further embodiment, the data store 608 may be connected to the server 600 through a network, such as, for example, a network attached file server.

The memory 610 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 610 may incorporate electronic, magnetic, optical, and/or other types of storage media. Note that the memory 610 may have a distributed architecture, where various components are situated remotely from one another, but can be accessed by the processor 602. The software in memory 610 may include one or more software programs, each of which includes an ordered listing of executable instructions for implementing logical functions. The software in the memory 610 can include a suitable operating system (O/S) 614 and one or more programs 616. The operating system 614 can control the execution of other computer programs, such as the one or more programs 616, and provide scheduling, input-output control, file and data management, memory management, and communication control and related services. The operating system 614 may be any of Windows NT, Windows 2000, Windows XP, Windows Vista, Windows 7, Windows Server 2003/2008 (all available from Microsoft, Corp. of Redmond, Wash.), Solaris (available from Sun Microsystems, Inc. of Palo Alto, Calif.), LINUX (or another UNIX variant) (available from Red Hat of Raleigh, N.C.), Android and variants thereof (available from Google, Inc. of Mountain View, Calif.), or the like. The one or more programs 616 may be configured to implement the various processes, algorithms, methods, techniques, etc. described herein.

According to an embodiment of the invention, the methodology disclosed herein can be perform by a client end software installed on the mobile device, and such client end software can control the mobile device hardware to perform the method, such as, but not limited to CPU 522, memory 530 and network interface 550, as shown in FIG. 5.

Figure 7:
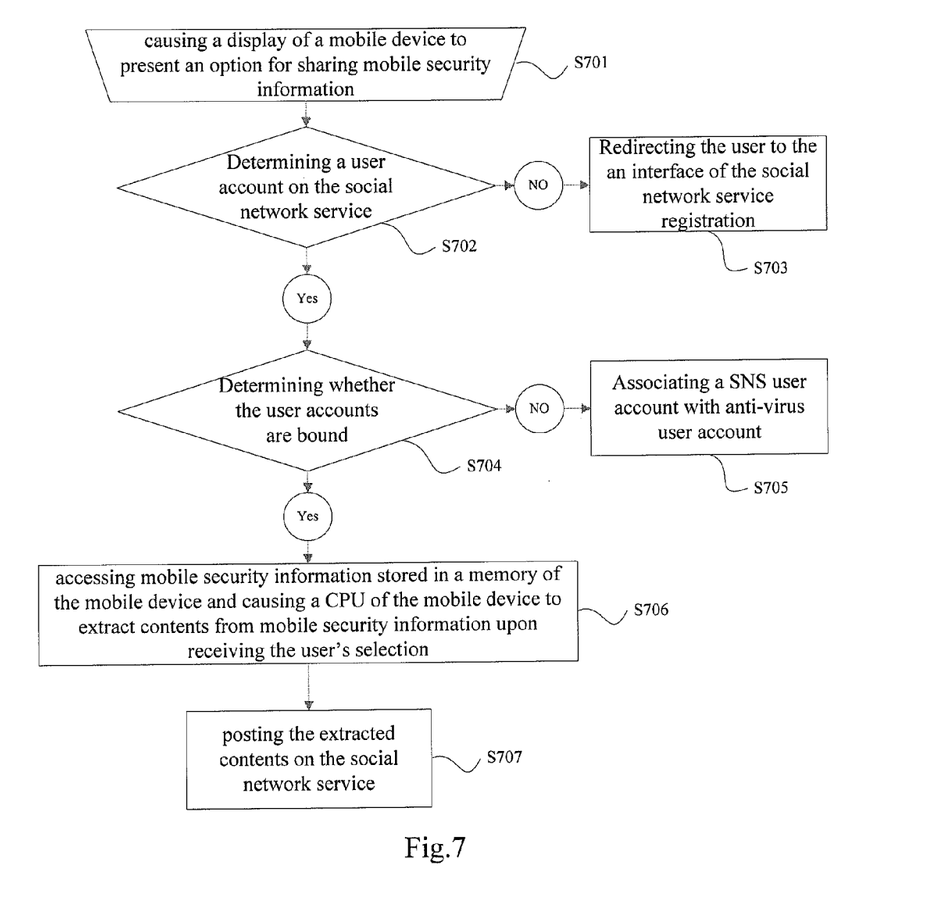
FIG. 7 shows a flowcharts and block diagrams of the process for sharing mobile security information according to an embodiment.

Referring to FIG. 7, the method for sharing mobile security information can start from step S701, causing a display of a mobile device to present an option for sharing mobile security information. As shown in FIG. 4a, the option can include a check box corresponding to the detected security threat and a button labeled "Sharing." It should be understood that other format or user interface layout may be applied to achieve the purpose of providing the option to users.

At step S702, the client end can access the memory of the mobile device to determine whether there is an active user account for the desired social network service. For example, the client end can access a particular folder to find user account information, and if no relevant user account information is found the client end can get the feedback that no active user account exists. As step S703, the client end can redirect the user to a web address provide by the social network service for new user registration.

At step S704, if an active user account for the social network service exists, the client end can determine whether the user account for the social network service is bound to the user account for the anti-virus software. If the accounts have not been bound, the client end can start binding process at step S705. At step S706, the anti-virus client end can access security information stored in a memory 530 of the mobile device, and cause a CPU 522 of the mobile device to extract content from security information upon receiving the user's selection. At step S707, a request can be sent to a social network service for posting the extracted content through network interface 550 of the mobile device.

Figure 8:
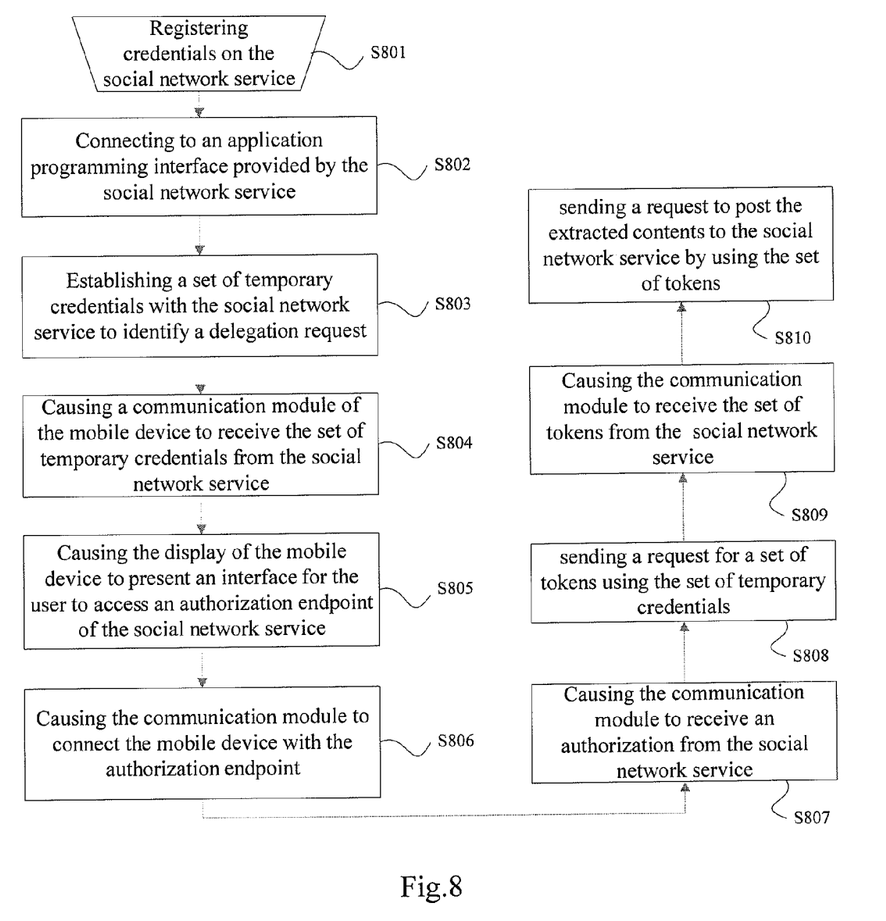
FIG. 8 shows a flowcharts and block diagrams of the detailed process for sharing mobile security information according to an embodiment.

According to an embodiment of the invention and as shown in FIG. 8, the process to associate user account on the social network service with user account on the anti-virus client software can start with step S801, registering credentials on the social network service. For example, if the social network service is Sina Microblog, the anti-virus software provider has signed up for a set of Sina Microblog client credentials ahead of time. At step S802, the anti-virus software can have also configured its application to connect to the protocol endpoints listed in the Sina Microblog API documentation, which can use the "HMAC-SHA1" signature method. At step S803, before the anti-virus software can ask the user to grant it access to the Sina Microblog account, the anti-virus software can first establish a set of temporary credentials with the Sina Microblog to identify the delegation request. To do so, the anti-virus client can send the following HTTPS request to a Sina Microblog server, the server can validate the request and reply with a set of temporary credentials in the body of the HTTP response, and the anti-virus client can receive that HTTP response at step S804. At step S805, the anti-virus client can redirect user's user-agent to the Sina Microblog server's Resource Owner Authorization endpoint. At step S806, the anti-virus client can connect to Sina Microblog server's Resource Owner Authorization endpoint to obtain user's approval for accessing his/hers Sina Microblog. At step S807, the Sina Microblog server can request the user to sign in using his/her username and password, and if successful, require the user to approve granting the anti-virus client access to his/her private Sina Microblog account. Upon the user's approval of the request, the user-agent can be redirected to the callback URI provided by the anti-virus client in the previous request. At step S808, the callback request can inform the user that he/she has completed the authorization process, and the anti-virus client can then request a set of token credentials using the temporary credentials obtained previously at step S804. At step S809, the Sina Microblog server can validate the request and reply with a set of token credentials in the body of the HTTP response, and the anti-virus client can receive the set of token credentials through the network interface of the mobile device. With a set of token credentials, the anti-virus client can now be ready to request access to and use the user account on Sina Microblog. At step S810, a request can be sent to Sina Microblog server to post the extracted content by using the set of tokens received at step S809. The Sina Microblog server can validate the request and respond by posting the extracted content, and the anti-virus client can be able to continue accessing the user's private Sina Microblog account using the same set of token credentials for the duration of the user's authorization, or until the user revokes access.

Figure 9:
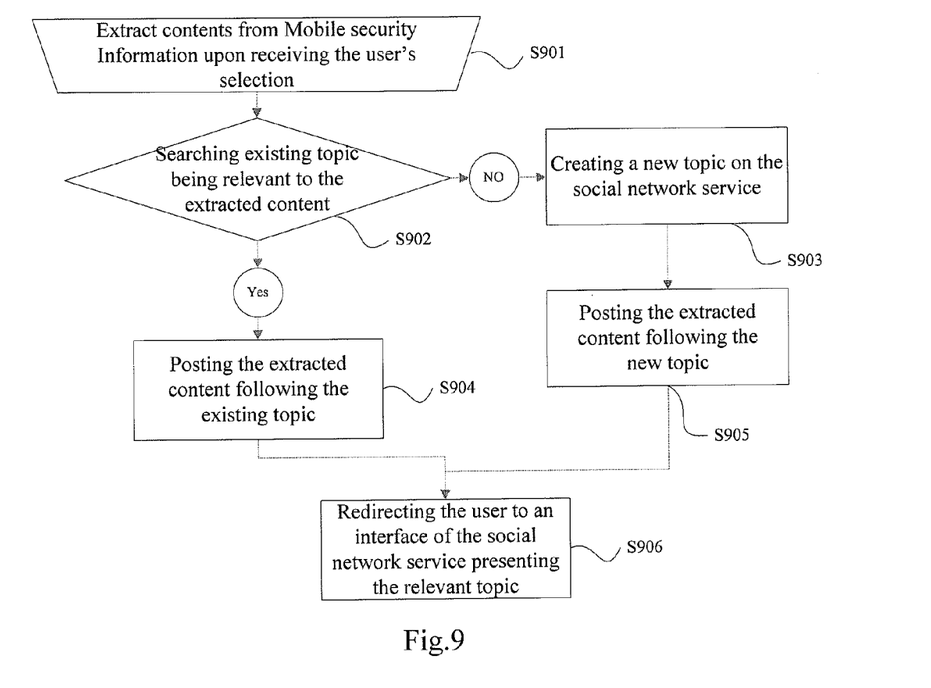
FIG. 9 shows a flowcharts and block diagrams of the detailed process for micro blogging topic management according to an embodiment.

According to an embodiment of the invention, posting the extracted content can comprise detailed steps as shown in FIG. 9. At step S901, the anti-virus client can extract content from security information upon receiving the user's selection. At step S902, the anti-virus client can send a request to the social network server for detecting topics posted on the social network service that are relevant to the extracted content. If no relevant topic is found, the anti-virus client can send a request to the social network server for creating new topic on the social network service with the extracted content at step S903. At step S905, the extracted content is posted following the new topic. If at least one relevant topic on the social network service detected at step S902 exists, the anti-virus client can send a request to the social network server for posting the extracted content following the existing topics on the social network service at step S904. At step S906, the anti-virus client can redirect the user to an interface of the social network service presenting the relevant topics.

Figure 10:
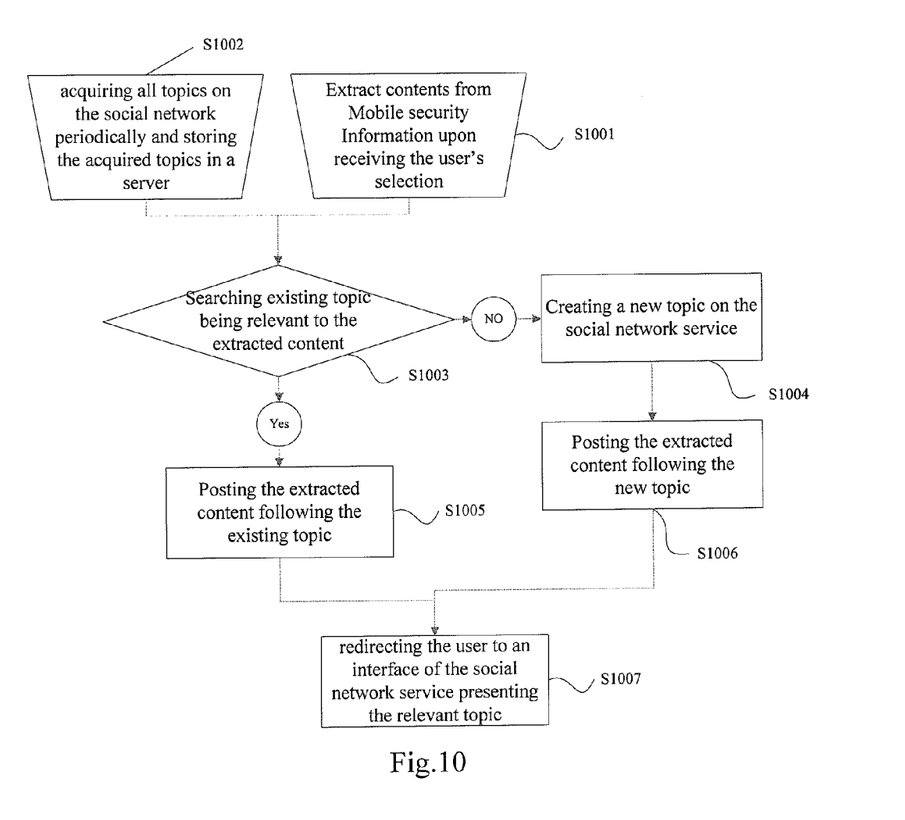
FIG. 10 shows a flowcharts and block diagrams of the detailed process for micro blogging topic management according to an embodiment.

According to an embodiment of the invention, posting the extracted content can comprise detailed steps as shown in FIG. 10. At step S1001, the anti-virus client can extract content from security information upon receiving the user's selection. At step S1002, the anti-virus client can access the social network server to acquire all topics on the social network periodically and storing the acquired topics in an anti-virus server. At step S1003, the anti-virus client can send a request to the anti-virus server for detecting topics posted on the social network service that are relevant to the extracted content. If no relevant topic is found, the anti-virus client can send a request to the social network server for creating new topic on the social network service with the extracted content at step S1004. At step S1006, the extracted content is posted following the new topic. If at least one relevant topic on the anti-virus server detected at step S1003 exists, the anti-virus client can send a request to the social network server for posting the extracted content following the existing topics on the social network service at step S1005. At step S1007, the anti-virus client can redirect the user to an interface of the social network service presenting the relevant topic. According to an embodiment of the invention, the server can also acquire all information posted by anti-virus client end users on the social network periodically and store the acquired information in an anti-virus server. Therefore, the anti-virus server may have all information posted by anti-virus client end users. With the information stored in the anti-virus server, the anti-virus software provider may get statistics on how many users have paid attention on the security information, how many users have been infected with mobile virus, or which virus have been distributed broadly, etc.

According to another embodiment of the invention, the method for sharing mobile security information can include establishing an account for the anti-virus client software on the social network service, and any information posted by users of the anti-virus client software can be forwarded to the account for the anti-virus client software. In addition, all posting under the account for the anti-virus client software can be accessible for the users of the anti-virus client software to search, read, or follow. Therefore, the information posted under the account for the anti-virus client software can constitute an on-line library for mobile security information.

3. Conclusion

While shown and described herein as methods and systems for mobile information security protection, disclosure in this document may provide various additional features. For example, in an embodiment, a program product can be stored on a computer-readable medium, which when executed, can enable a computer infrastructure to share mobile security information. To this extent, the computer-readable medium can include program code, such as local end 110 (FIG. 2), which can implement the process described herein. It is understood that the term "computer-readable medium" can comprise one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory 530 (FIG. 5) and/or date storage 554 (FIG. 5), and/or as a data signal traveling over a network (e.g., during a wired/wireless electronic distribution of the program product).

In addition, a method of generating a system for sharing mobile security information can be included. In this case, a computer infrastructure, such as sever computer system 600 (FIG. 6), can be obtained (e.g., created, maintained, having been made available to, etc.) and one or more systems for performing the process described herein can be obtained (e.g., created, purchased, used, modified, etc.) and deployed to the computer infrastructure. To this extent, the deployment of each system can comprise one or more of: (1) installing program code on a computing device, such as sever computer 600 (FIG. 6), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" can be synonymous and mean any expression, in any language, code or notation, of a set of instructions that can cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like. Further, it is understood that the terms "component" and "system" can be synonymous as used herein and represent any combination of hardware and/or software capable of performing some function(s).

The flowcharts and block diagrams in the figures help to illustrate the architecture, functionality, and operation of possible implementations of systems, methods and computer program products according to various embodiments disclosed herein. In this regard, each block in the flowchart or block diagrams may represent a module, segment, or portion of code, which can comprise one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the disclosure has been particularly shown and described with reference to example embodiments thereof, it will be understood by those of ordinary skilled in the art that various changes in form and details may be made therein without departing from the spirit and scope of the present invention as defined by the claims. In addition, those of ordinary skill in the art appreciate that any arrangement which is calculated to achieve the same purpose may be substituted for the specific embodiments shown and that the invention can have other applications in other environments.

We claim:

1. A mobile device for sharing virus-related information, comprising:
   a processor;
   a memory coupled to the processor;
   a display coupled to the processor; and
   a communication module executed at the processor,
   wherein the processor is configured to:
      detect one or more virus IDs using virus scanning of the mobile device;
      store the virus-related information in the memory, wherein the virus-related information pertains to the one or more virus IDs;
      control the display to provide an option to share the virus-related information;
      access the virus-related information stored in the memory and extract content from the virus-related information, upon receiving a selection; and
      control the communication module to connect with a social network service and upload the extracted content to the social network service,
   wherein when the processor is configured to control the communication module to connect with a social network service, the processor is further configured to:
      control the display of the mobile device to provide an interface to access an authorization endpoint of the social network service;
      cause the communication module to receive an authorization from the social network service;
      read a set of temporary credentials stored in the memory of the mobile device;
      cause the communication module to send a request for a set of tokens using the set of temporary credentials; and
      cause the communication module to receive the set of tokens from the social network service,
      wherein the set of tokens are sent to the social network service together with a request to post the extracted content to the social network service,
   wherein when the processor is configured to upload the extracted content to the social network service, the processor is further configured to:
      detect whether there is a topic posted on the social network service that is relevant to the extracted content, and
      post the extracted content on a relevant topic on the social network service if the relevant topic is detected; and
      create a new topic with the extracted content on the social network service if no relevant topic is detected, and post the extracted content on the new topic.

2. The mobile device of claim 1, wherein the social network service comprises a social network website and a micro blogging service.

3. The mobile device of claim 2, wherein the processor is further configured to associate a user identifier on the social network service with a user identifier on a mobile security application.

4. The mobile device of claim 1, wherein the processor is further configured to create an account on the social network service which identifies the extracted content of the virus-related information.

5. The mobile device of claim 1, wherein the processor is further configured to access a virus-related information database through an application programming interface provided by the social network service.

6. The mobile device of claim 1, wherein the processor is further configured to communicate with a server end which stores all topics posted on the social network service periodically, and the processor is further configured to transmit a request for searching a relevant topic and receive a detected relevant topic.

7. A method of sharing virus-related information at a mobile device comprising steps of:
   detecting one or more virus IDs using virus scanning of the mobile device;
   storing the virus-related information in a memory of the mobile device, wherein the virus-related information pertains to the one or more virus IDs;

controlling a display of the mobile device to provide an option to share the virus-related information;

accessing the virus-related information stored in the memory of the mobile device and extract content from the virus-related information, upon receiving a selection; and controlling a communication module of the mobile device to connect with a social network service and uploading the extracted content to the social network service, wherein the step of controlling a communication module of the mobile device to connect with a social network service further comprises steps of:

controlling the display of the mobile device to provide an interface to access an authorization endpoint of the social network service;

causing the communication module to receive an authorization from the social network service;

reading a set of temporary credentials stored in the memory of the mobile device;

causing the communication module to send a request for a set of tokens using the set of temporary credentials; and causing the communication module to receive the set of tokens from the social network service, wherein the set of tokens are sent to the social network service together with a request to post the extracted content to the social network service, wherein the step of uploading the extracted content to the social network service further comprises steps of:

detecting whether there is a topic posted on the social network service that is relevant to the extracted content; and posting the extracted content on a relevant topic on the social network service if the relevant topic is detected; and creating a new topic with the extracted content on the social network service if no relevant topic is detected, and posting the extracted content on the new topic.

8. The method of claim 7, wherein the social network service comprises a social network website and a micro blogging service.

9. The method of claim 8, further comprising associating a user identifier on the social network service with a user identifier on a mobile security application.

10. The method of claim 7, further comprising creating an account on the social network service which identifies the extracted content of the virus-related information.

11. The method of claim 7, further comprising accessing a virus-related information database through an application programming interface provided by the social network service.

12. The method of claim 7, further comprising:

communicating with a server end which stores all topics posted on the social network service periodically, wherein the step of communicating with a server end further comprises steps of:

transmitting a request for searching a relevant topic; and receiving a detected relevant topic.

\* \* \* \* \*